J. J. HERLBAUER.
AUTOMOBILE TRUCK.
APPLICATION FILED DEC. 27, 1917.
1,269,435.
Patented June 11, 1918.
2 SHEETS—SHEET 1.
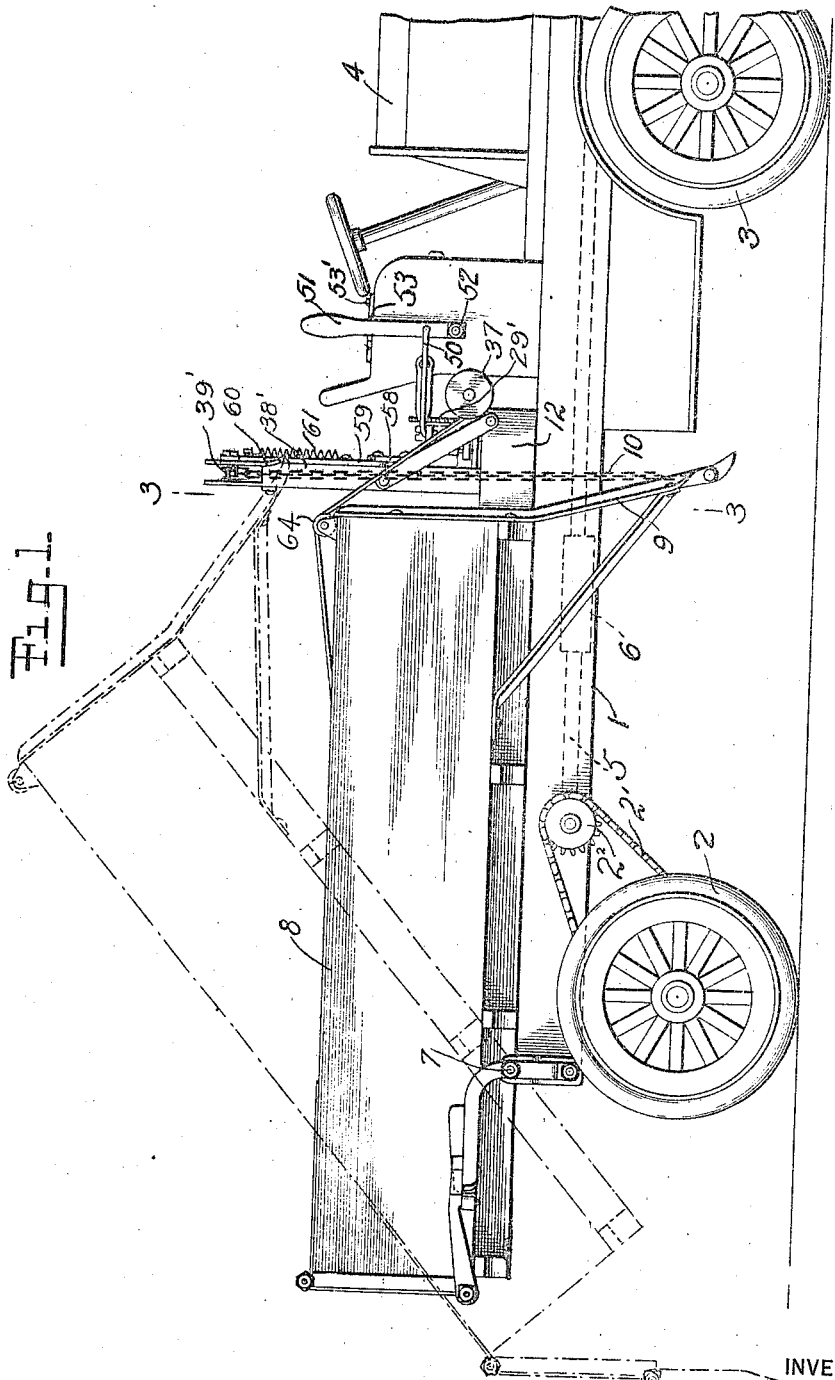
INVENTOR
ATTORNEYS

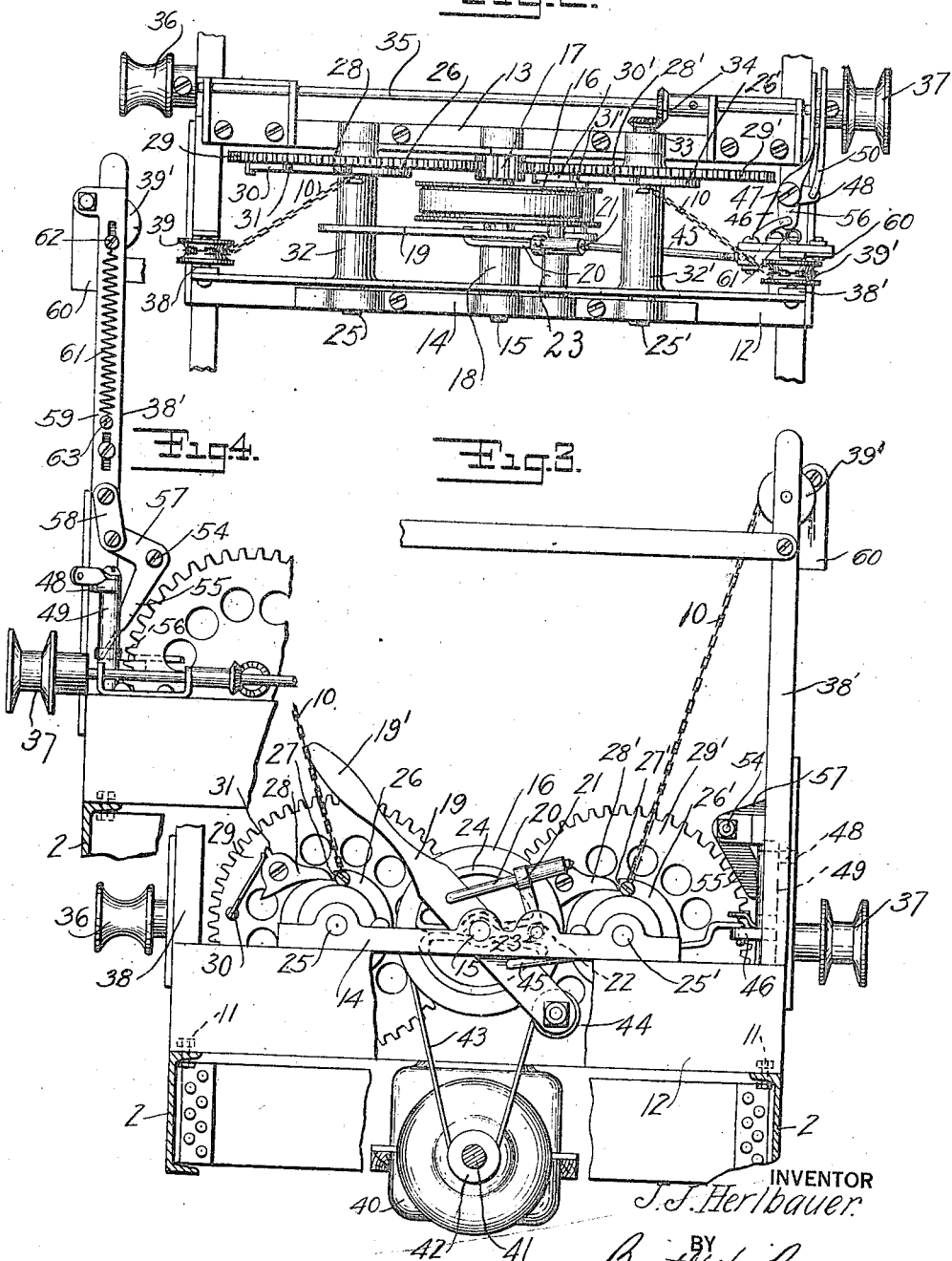

UNITED STATES PATENT OFFICE.

JOSEPH JAMES HERLBAUER, OF RICHMOND HILL, NEW YORK.

AUTOMOBILE-TRUCK.

1,269,435. Specification of Letters Patent. Patented June 11, 1918.

Application filed December 27, 1917. Serial No. 209,046.

*To all whom it may concern:*

Be it known that I, JOSEPH J. HERLBAUER, a citizen of the United States, residing at Richmond Hill, county of Queens, State of New York, have invented a certain new and useful Improvement in Automobile-Trucks, of which the following is a full, clear and exact description.

My invention relates to improvements in automobile trucks and has for its object to provide a new and improved automobile truck, having a hoisting drum or windlass or both driven by the truck-driving motor for general uses. It further has for its object to provide a dump truck having such features and in which the dumping action is brought about by the operation of the motor of the automobile. It further has for its object to produce a self-contained hoisting attachment for automobile dump trucks which can be applied to any truck having space therefor, the hoisting apparatus being self-contained and carried by its own frame separable and distinct from the frame of the truck.

The following is a description of an embodiment of my invention, reference being had to the accompanying drawings, in which:

Figure 1 is a side elevation of a truck embodying my invention;

Fig. 2 is a plan view of the separable dumping unit, the same consising of a frame adapted to be attached to the frame of the truck and carrying mechanism adapted to be driven by the truck motor;

Fig. 3 is a section on the line 3—3, Fig. 1, showing a rear end elevation of the mechanism shown in Fig. 2;

Fig. 4 is a detail of the right hand end of Fig. 2 in front elevation.

Referring more particularly to the drawings, 1 is the frame of an automobile truck comprising the ordinary U beams. 2 are the driving wheels driven by a chain 2' from the sprocket 2²; 3 are the front wheels; 4 is the automobile hood used when the motor is of either the gasolene or steam type; 5 is the transmission shaft, and 6 is the clutch for connecting and disconnecting the motor to and from the rear portion of the transmission shaft and wheels 2. Pivoted to the frame at 7 is the body 8, provided with downwardly extending goose-necks 9, to which are attached hoisting chains 10, by which the forward end of the truck body is lifted so as to be tilted from the position shown in full lines to the position shown in dotted lines. Bolted to the frame of the body by bolts 11 is a removable frame consisting of a hollow base 12, carrying on its front and rear edges bearings 13 and 14. In the central bearings is a shaft 15 upon which is rigidly mounted a pulley 16 and a pinion 17. Loosely mounted upon the shaft 15 is a sleeve 18 carrying a lever 19 which at a point above the shaft 15 is connected by a rod 20 to a lever 21 connected to a cam 22 mounted on a stud 23, cam 22 when moved to the position shown in Fig. 3 acting to apply a brake 24 to the pulley by separating the leaves of the brake spring housed within the pulley 16. Mounted in other journals in the bearing block 13 are shafts 25, 25', carrying disks 26, 26', provided respectively with notches 27, 27', adapted to be engaged by pawls 28, 28'. These pawls are pivoted to gear wheels 29, 29' respectively, which wheels carry springs 30, 30', engaging projections 31, 31', so as to hold said pawls either in engagement with the notches 27 and 27' respectively, or out of engagement with said notches. The gear wheels 29, 29' are fixedly mounted upon their shafts 25, 25' so as to always revolve therewith and mesh into pinion 17. The shafts 25, 25' carry drums 32, 32' connected to the disks 26, 26' and loosely mounted on the shafts 25, 25' so that the shafts can revolve independently thereof, except as the disk and drums are restrained by the pawls 28, 28' engaging notches 27, 27' of the disks 26, 26'. The shaft 25' carries on its front end a beveled gear 33, which meshes with a beveled gear 34 carried by a shaft 35 mounted in suitable journals attached to the front side of the frame 12. This transverse shaft 35 carries supplemental drums, one on its left-hand end in the form of a windlass or niggerhead 36, and the other on its right-hand end in the form of a winding drum 37. Mounted on the two sides of the frame are two uprights 38, 38', carrying sheaves 39, 39' over which pass the chains 10, which chains are connected respectively to the drums 32, 32' and the goose-necks 9.

40 is the driving motor of the automobile having a shaft 41, which carries a pulley 42. 43 is a loose belt passing around the pulleys 16 and 42. The lower end of the lever 29 is provided with an idler pulley 44 which bears against the belt 43 and tightens or loosens the same according to the change in the position of the lever 19. The lower end of this lever 19 is connected by a rod 45 to one end of a bell-crank lever 46 pivoted at 47, the power lever 48 being connected thereto by a sleeve 49. This power lever is connected by a rod 50 to a handle 51 pivoted at 52 adjacent to the driver's seat. The driver's seat is provided with a detent 53 pivoted at 53′, which is adapted to hold the handle 51 in backward position when desired for purposes hereinafter stated. A backward movement of the handle 51 results in a movement of the lever arm 46, rod 45 and idler 44 to the left (Fig. 3) tightening the belt 43. Upon the forward return movement of the handle the belt is loosened so as to operatively disconnect the pulleys 16 and 42 and the cam 23 applies the brake 24 to the pulley 16 by reason of the action of the lever 19 upon the arm 21 through the connection 20.

When it is desired to lift the forward end of the box body the handle 51 is moved backward, thus causing the idler 44 to tighten the belt 43, causing the pulley 16 and pinion 17 to revolve when the motor is running. The pinion 17 when driven by the motor drives the gear wheels 29, 29′. Thereupon the pawls 28, 28′ when in engagement with their notches 27, 27′, connect the body to the motor and cause the drums 32, 32′ to revolve so as to wind up the chains 10 and lift the front end of the box body. If it is desired to drive the niggerhead 36 and drum 37 for hoisting purposes, the pawls 28, 28′ are moved so as to be out of engagement with their notches 27, 27′. When the handle 51 is then pushed backward, the motor 40 being in operation, the wheels 29, 29′, together with the shafts 25, 25′ and the beveled gear 33, are driven without driving the drums 32, 32′, so that the niggerhead 36 and winding drum 37 are driven independently of the body tilting means and without affecting the box body can be driven as long as desired for hoisting or pulling purposes. If it is desired to drive either of them continuously for any considerable length of time, the pawl 53, pivoted at 53′, can be moved so as to hold the handle 51 permanently in backward position for that purpose. In this way the automobile motor can be used to either dump the truck or to operate the niggerhead and winding drum without affecting the body of the car. When the handle 51 is being actuated to dump the truck, it is of importance to have the idler 44 withdrawn when the front end of the truck has reached its highest desired point, and to do this automatically in case the driver fails to do so. For this purpose I provide a bell-crank lever pivoted at 54, having a downwardly extending arm 55, which engages a lever arm 56 rigidly connected to the sleeve 49 and lever arm 48. Connected to the arm 55 is another arm 57 which is connected through a link 58 with a slide 59 carried by the upright 38′ and having at its upper end an abutment 60 which is adapted to be engaged by the right-hand goose-neck 9 when it reaches its highest point. A spring 61 connected to the upright 38 at the point 62 and to the slide 59 at the point 63, tends to hold the slide in its uppermost position and acting through the lever arm 55 tends to move the handle 51 to its forward position and the brake 24 to applied position. When the handle 51 is moved forward, the spring 61 is extended and the abutment 60 lowered, so that when the right-hand goose-neck 9 engages the abutment 60, so as to move the slide 59 to its normal position, the handle 51 will be retracted, the power disconnected, and the brake 24 applied in spite of the fact that the operator's hand may be holding it.

In operating the device so as to use the winding drum 37 for hoisting purposes, the drum 37 can be actuated to wind up a cable for any desired distance so as to lift the object, and can then be permitted to revolve in the reverse direction under the action due to the weight of the lifted object for any desired distance and caught at that point by the brake 24 and thereafter lifted again by tightening the driving belt 43. The truck therefore has not only the advantages of being a dumping truck which utilizes the automobile motor for driving and dumping purposes, but also has the advantage of having means which can be operated by the truck motor in a manner similar to the ordinary motor driven hoist, and also the advantage of having a niggerhead which can be driven continuously and used in the ordinary manner for pulling purposes. When it is desired to pull heavy objects into the truck-body over skids and the like, I provide a pulley 64 mounted upon the forward end of the truck body for the rope passing to the niggerhead. When it is desired to dump the box body or operate the niggerhead and winding drum the clutch 6 is released in the ordinary manner so that the motor 40 runs without driving the wheels 2 of the automobile truck.

It is to be noted that with the exception of the shaft which carries the niggerhead and supplemental winding drum, the shafts for my improved mechanism are all parallel to the shaft of the motor, that is, they are parallel to the longitudinal axis of the truck.

In order that the hoisting mechanism may be controlled by means not dependent upon the described series of bell-cranks and links, I provide a handle 19′ extending directly from the lever 19, and easily accessible over the rear of the driver's seat so that it can be operated for any of the purposes for which the handle 51 can be operated to produce direct action on the lever 19. The gear wheels, etc., are so disposed that they can be easily covered by a housing or gear casing (not shown) so as to protect them from dirt and injury.

As will be evident to those skilled in the art, my invention permits of various modifications without departing from the spirit thereof or the scope of the appended claims.

What I claim is:

1. In an automobile truck having a frame, a body tiltable thereon, a clutch, a motor for driving said truck through said clutch, the combination therewith of a body tilting drum and a supplemental drum, means for connecting and disconnecting said drums with said motor, and independent means for connecting and disconnecting said lifting drum with said motor and supplemental drum, a brake which controls both said supplemental drum and said lifting drum, and a lever for actuating both said brake and said first connecting and disconnecting means.

2. In an automobile truck having a frame, a body tiltable thereon, a clutch and a motor for driving said truck through said clutch, the combination therewith of a supplemental drum having its axis transverse to the longitudinal axis of said truck, a shaft geared to said supplemental drum, lifting drums revoluble independently of said first mentioned drum, means for operatively connecting and disconnecting said shaft and said lifting drums, and means for connecting and disconnecting said shaft and said motor and a brake which controls both said supplemental and lifting drums through said shaft.

3. In an automobile truck having a frame, a body tiltable thereon, a clutch, a motor for driving said truck through said clutch, the combination therewith of a pinion, two drum-carrying shafts having gears meshing with said pinion, two tilting drums loosely carried by said shafts, lifting cables connecting said tilting drums and the forward end of said tiltable body, the axes of said pinion and shafts being parallel to the longitudinal axis of said truck, a shaft at right angles to the axis of one of said drum-carrying shafts and geared thereto, a supplemental drum on said transverse shaft, and means for connecting and disconnecting said tilting drums and their shafts, and means for connecting and disconnecting said motor and pinion.

4. In an automobile truck having a frame, a body tiltable thereon, a clutch, a motor for driving said truck through said clutch, the combination therewith of a body tilting drum and a supplemental drum, means for connecting and disconnecting said drums with said motor, independent means for connecting and disconnecting said lifting drum with said motor and supplemental drum, and a base separable from said frame and supporting said drums and shaft.

5. In an automobile truck having a frame, a body tiltable thereon, a clutch, a motor for driving said truck through said clutch, the combination therewith of a body tilting drum and a supplemental drum, means for connecting and disconnecting said drums with said motor, independent means for connecting and disconnecting said lifting drum with said motor and supplemental drum, a brake for said drums, and means for alternately applying said brake and actuating the means for connecting said drums and motor.

JOSEPH JAMES HERLBAUER.